United States Patent [19]

Hoobyar et al.

[11] Patent Number: 5,152,500
[45] Date of Patent: Oct. 6, 1992

[54] ASEPTIC VALVE CONSTRUCTION

[75] Inventors: Luther T. Hoobyar, Mountain View; Walter L. Connolly, Moraga; Timothy G. Hughes, Walnut Creek; Cornelius R. Aarts, Lafayette, all of Calif.

[73] Assignee: Asepco, Inc., Mountain View, Calif.

[21] Appl. No.: 738,226

[22] Filed: Jul. 30, 1991

Related U.S. Application Data

[63] Continuation-in-part of Ser. No. 675,508, Mar. 27, 1991.

[51] Int. Cl.⁵ .............................................. F16K 7/12
[52] U.S. Cl. .................................... 251/269; 137/240; 251/331
[58] Field of Search ................. 251/269, 331; 137/240

[56] References Cited

U.S. PATENT DOCUMENTS

| 2,645,238 | 7/1953 | Thornbery | 251/331 X |
| 2,729,222 | 1/1956 | Dickey | 251/331 X |
| 2,988,322 | 6/1961 | Anderson | 251/331 |
| 3,073,566 | 1/1963 | Bredtschneider | 251/269 X |
| 3,134,570 | 5/1964 | Jarrett | 251/331 |
| 4,014,514 | 3/1977 | Priese | 251/331 |
| 4,653,526 | 3/1987 | Hoiss | 137/240 |
| 4,819,691 | 4/1989 | Lofgren | 251/331 |
| 4,836,236 | 6/1989 | Ladisch | 251/331 X |

FOREIGN PATENT DOCUMENTS

| 601003 | 7/1960 | Canada | 251/269 |
| 1406016 | 6/1965 | France | 251/331 |

Primary Examiner—Robert G. Nilson
Attorney, Agent, or Firm—Flehr, Hohbach, Test, Albritton & Herbert

[57] ABSTRACT

In an aseptic valve construction, a valve body having an inlet flow passage and at least one outlet flow passage, said valve body having a valve seat surrounding the inlet flow passage, said body having an opening therein in alignment with the inlet passage and in communication with the inlet passage and with said at least one outlet passage, said body having a shoulder providing a shoulder seat surrounding said opening, an actuator sleeve adapted to be secured to said valve body, a shaft, means mounting said shaft in said sleeve to permit axial movement of said shaft in said sleeve, a diaphragm removably secured to said shaft, said diaphragm having a portion movable into engagement with the valve seat surrounding the inlet passage, diaphragm actuator means engaging said shaft for causing axial movement of said shaft for moving said diaphragm between open and closed positions with respect to said valve seat whereby in a closed position said diaphragm interrupts the flow of a liquid from the inlet passage through the outlet passage and in an open position permits the flow of liquid from the inlet passage to the outlet passage and means for preventing rotation of said diaphragm as said shaft is actuated to cause movement of said diaphragm between open and closed positions, said diaphragm having a portion engaging the shoulder seat which is retained in engagement with the shoulder seat during movement of the diaphragm between open and closed positions.

24 Claims, 4 Drawing Sheets

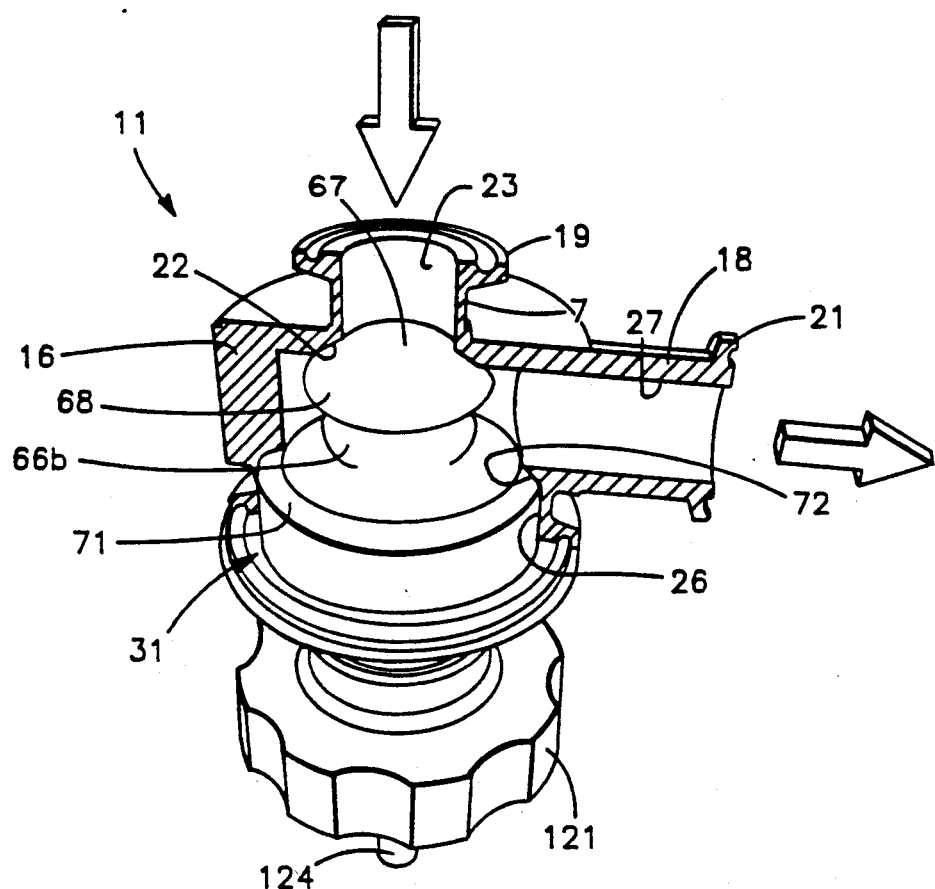
FIG.—1
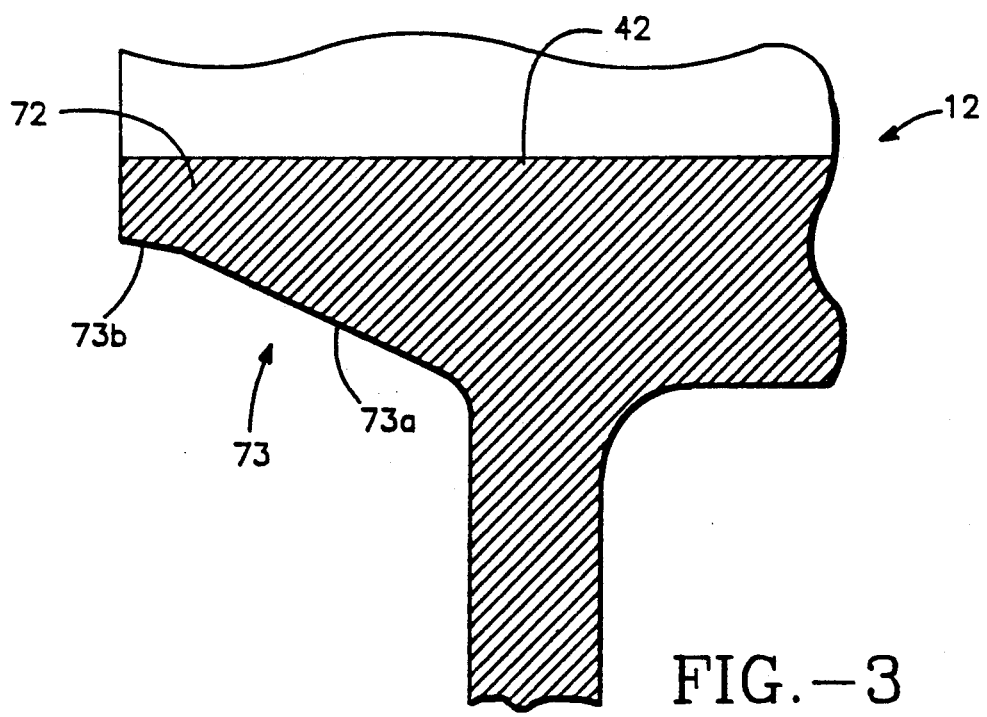
FIG.—3

ASEPTIC VALVE CONSTRUCTION

This application is a continuation-in-part of application Ser. No. 07/675,508 filed on Mar. 27, 1991.

This invention relates to an aseptic valve construction and more particularly to an aseptic valve construction for use as tank outlet valves and piping valves.

Tank outlet valves have heretofore been provided in the United States by Steridose Systems, Inc. Swedish Patent Publication No. 8404623-4 shows the construction of such a valve. In the past it has been found that the Steridose Systems, Inc. valves have certain disadvantages. For example, it has been found that certain embodiments of the valve have failed to drain properly and have undesirably retained liquid therein. A two-part actuator sleeve is utilized in such valves which has been found to inadvertently become unscrewed. The diaphragms in such valves are attached so that they can accidentally snap off the actuator shaft. Dual bellows are utilized with the diaphragms which are difficult to clean when the diaphragms and dual bellows are in full open position. Therefore there is a need for a new and improved tank outlet valve which overcomes the above-named disadvantages.

In general it is an object of the present invention to provide an aseptic valve construction which has excellent seals.

Another object of the invention is to provide a valve construction of the above character which drains completely.

Another object of the invention is to provide a valve construction of the above character which will drain completely in either "KNOB UP" or "KNOB DOWN" position.

Another object of the invention is to provide a valve construction of the above character which can have a diameter greater than one and one-half inches.

Another object of the invention is to provide a valve construction of the above character in which the diaphragm bellows will not snap in one direction or another during opening of the valve construction.

Another object of the invention is to provide a valve which cannot become disassembled by merely turning the actuator knob too far in either direction.

Additional features and objects of the invention will appear in the following description in which the preferred embodiments are set forth in detail in conjunction with the accompanying drawings.

FIG. 1 is an isometric view of an aseptic valve construction in the form of a tank outlet valve having one 90° outlet incorporating the present invention showing certain parts in the cross-section.

FIG. 3 is an enlarged cross-sectional view of the construction of the lip in one of the seals utilized in the tank outlet valve shown in FIG. 2.

In general, the aseptic construction valve of the present invention is comprised of a valve body having an inlet and at least one outlet. The valve body has a valve seat surrounding the inlet. The valve body has an opening therein in alignment with the inlet and in communication with the inlet and the outlet. A shoulder is provided in the body which surrounds that opening. A shaft is disposed in the opening. An actuator sleeve surrounds the shaft and is secured to the valve body. Means is provided to permit axial sliding of the shaft in the actuator sleeve. Means is secured to the shaft to prevent rotation of the shaft. A diaphragm is mounted on the shaft and is formed with a portion to engage the shoulder and form a seal therewith. The diaphragm is also formed with another portion movable into and out of engagement with the valve seat to interrupt or permit flow through the inlet into the valve body and through the outlet. The diaphragm and the valve body are constructed in such a manner so that when said portion of said diaphragm moves into engagement with the valve seat, the valve will drain completely through the outlet.

Figure 2:
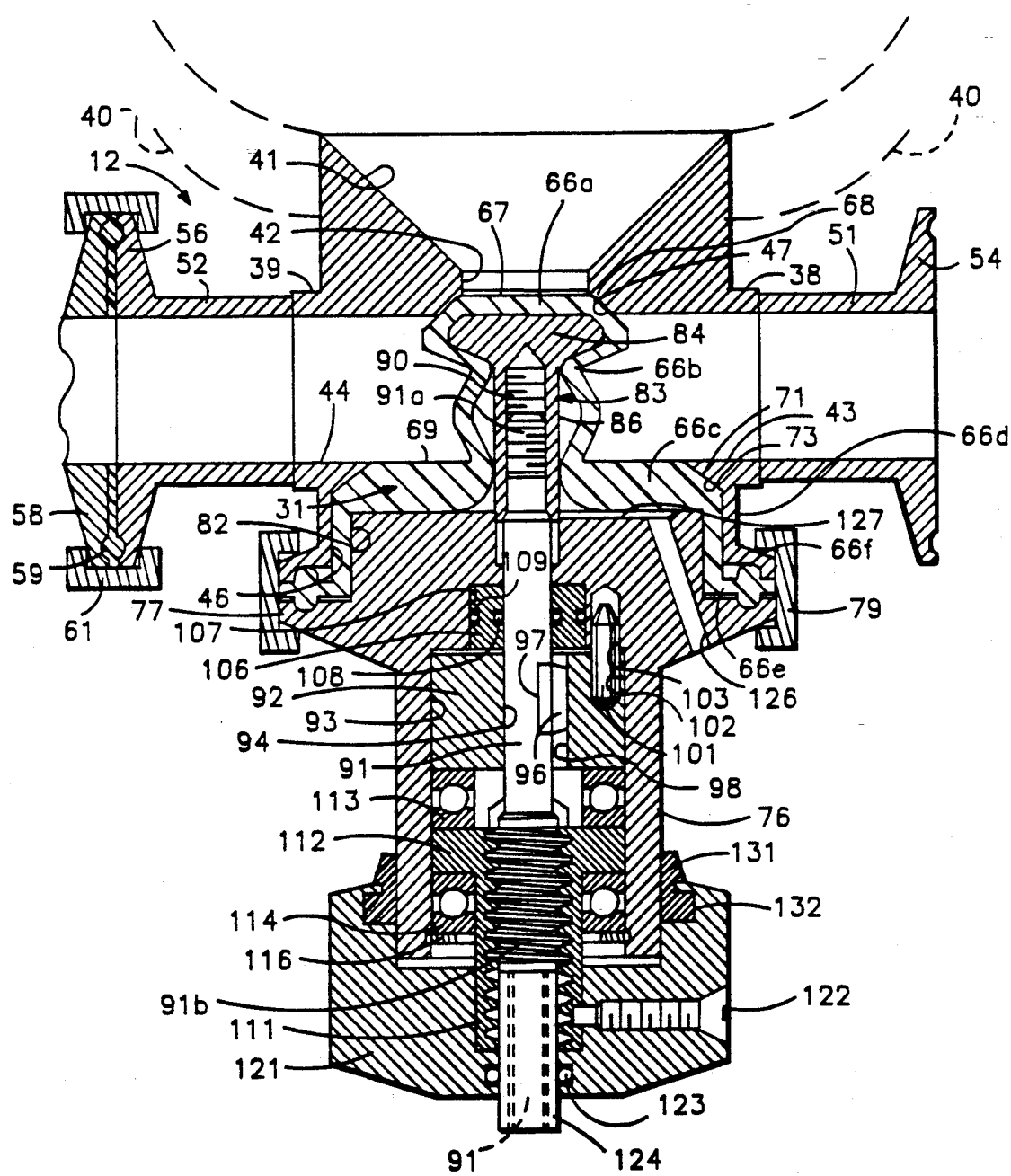
FIG. 2 is an enlarged cross-sectional view of a tank outlet valve similar to that shown in FIG. 1 but with which is provided with two 90° outlets.

More particularly as shown in FIG. 1, the aseptic valve construction of the present invention takes the form of a process outlet valve 11 having a single 90° outlet, or alternatively as shown in FIG. 2 a tank outlet valve 12 having two 90° outlets. Both of the valves 11 and 12 are constructed in a similar manner except that one is provided with two outlets rather than one outlet. They also differ as hereinafter described in that in FIG. 1 the outlet valve 11 is provided a flanged inlet and in FIG. 2, it is provided with a welded inlet. The tank outlet valve 11 is provided with a valve body 16 which has an inlet 17 and at least one outlet 18. The inlet 17 and outlet 18 are provided with flange 21 which are adapted to receive flat gaskets with integral O-ring sections (not shown).

The valve body 16 is provided with an annular valve seat 22 which circumscribes the inlet flow passage 23 and the inlet 17. The valve body 16 is provided with an opening 26 which is opposite of the inlet flow passage 23 and is in alignment therewith. The opening 26 is in communication with the flow passage 23 as well as a flow passage 27 provided in the outlet 18. Diaphragm means 31 is provided for closing the opening 26 in the body and also for movement into and out of engagement with the inlet valve seat 22 for controlling the flow of liquid from inlet passage 23 through the outlet passage 27.

The tank outlet valve 12 shown in FIG. 2 is constructed in a manner similar to the tank outlet valve 11 shown in FIG. 1 and is provided with a valve body 36 having an inlet 37 and having first and second outlets 38 and 39 extending at right angles to the inlet 37 and being aligned with each other. The inlet 37 is in the form of a tank fitting that is adapted to be welded into the bottom wall 40 shown in broken lines of a tank (not shown). The inlet is provided with a truncated cone-shaped passage 41 that is adapted to open into the tank and extends into a cylindrical inlet passage 42 which is in communication with the outlet flow passages 43 and 44 provided in the outlets 38 and 39. The valve body 36 is provided with an opening 46 which is opposite the inlet flow passage 41 and is axially aligned therewith. The valve body 36 is also provided with an annular valve seat 47 which circumscribes the cylindrical inlet flow passage 42. When the tank outlet valve is opened, fluids in the tank flow directly into the conical passage way of inlet flow passage 41 and thence to the outlet passages 43 and 44.

Diaphragm means 31 of the type hereinbefore described is utilized for closing the opening 46 in the valve 12 and for forming a seal with the valve seat 47 to interrupt communication between the inlet flow passage 41 and the outlet flow passages 42 and 43.

Outlet fittings 51 and 52 are secured to the outlets 38 and 39 by suitable means such as welding. Flanges 54 and 56 are formed integral with the outlet fittings 51 and 52. The flanges 54 and 56 are provided with annular recesses 57 which are semi-circular in cross-section. The flanges 54 and 56 are adapted to be secured to other mating flanges. For example, a mating flange 58 with a flat gasket with integral O-ring section 59 forms a liquid-tight seal with the outlet 52 by a removable sanitary clamp 61 of a conventional type, such as one manufactured by Tri-Clover, Inc. of Kenosha, Wis. 53141. The flange 54 can be connected to another mating flange (not shown) in a similar manner.

The diaphragm means 31 consists of a diaphragm 66 which is made of a suitable material such as a medical grade silicone rubber. The diaphragm 66 is provided with an upper portion 66a which is provided with a planar surface 67 that extends across the inlet passage 23 of the valve 11 and the inlet passage 41 of the valve 12. The planar surface 67 adjoins an outwardly and downwardly inclined annular surface 68. The head or upper portion 66a is formed integral with the intermediate portion or bellows portion 66b of the diaphragm which is of smaller diameter and is convoluted in an axial direction. The portion 66b adjoins a circular base portion 66c which has an annular planar surface 69 which is adapted to be moved into alignment with the outlet flow passages 43 and 44 for purposes hereinafter described.

The base portion 66c is also provided with a downwardly and outwardly inclined annular surface 71 which is adapted to engage an annular inclined shoulder valve seat 72 provided in the valve body 16 of the valve 11 which circumscribes the opening 26 and similarly engages a shoulder valve seat 73 provided in the valve body 36 of the valve 12 and circumscribes the opening 46 therein to provide primary axial seals between the diaphragm 66 and the valve bodies 16 and 36. A detail view of the shoulder valve seat 73 provided on the valve body 36 of the valve 12 is shown in FIG. 3. As shown thereon, the shoulder valve seat 73 is the form of an annular surface 73a which is inwardly and upwardly inclined at a suitable angle, as for example, an angle of 25° from the horizontal with an innermost annular lip 73b which is inclined downwardly slightly from the annular surface 73a at a suitable angle, as for example, 15° from the horizontal to provide an improved seal with the diaphragm 66 particularly in the region of the lip 73b.

The diaphragm 66 is provided with a portion 66d which adjoins the base portion 66c and depends downwardly therefrom and adjoins a radially extending portion 66e having an enlargement 66f formed therein which forms a secondary radial seal between the diaphragm 66 and the valve bodies 16 and 36. The portions 66e and 66f of the diaphragm 66 are formed in the outer margin of the diaphragm 66 and are clamped between an actuator sleeve or actuator housing 76 and the valve body 16. The actuator sleeve is provided with a flange 77 which underlies the outer margin of the valve body 16 for valve 11 and the outer margin of the valve body 36 for valve 12 and which is clamped into engagement with the outer annular margin formed by the portions 66e and 66f of the diaphragm 66 by a sanitary clamp 79 of a conventional type.

The actuator sleeve 76 is provided with a diaphragm shoulder support member 81 which is seated within a cylindrical recess 82 provided in the diaphragm 66 and underlies the base portion 66c of the diaphragm 66. A diaphragm insert 83 is provided within the diaphragm 66 and is formed of a suitable material such as stainless steel. The insert 83 consists of a head 84 which is seated within the head portion 66a of the diaphragm 66 and a stem 86 which extends downwardly therefrom.

Diaphragm actuator means 89 is provided in the actuator sleeve 76 and consists of a shaft 91 mounted for axial movement in the actuator sleeve 76. The shaft 91 has its upper end portion 91a threaded so it is adapted to threadably engage the threaded bore 90 stem 86 of the insert 83 in the diaphragm 66. Means is provided for preventing rotation of the shaft 91 with respect to the diaphragm 66 so that the diaphragm 66 will not rotate. Such means consist of a key sleeve 92 seated within a bore 93 provided in the actuator sleeve 76. The key sleeve 92 is provided with a bore 94 through which the shaft 91 extends. A key 96 is provided for preventing rotation between the shaft 91 and the key sleeve 92 while permitting axial movement of the shaft 91 with respect to the key sleeve 92. The key 96 is seated in a key way 97 provided in the shaft 91 and in a key way 98 provided in the key sleeve 92. An anti-rotation pin 101 is seated within a bore 102 provided in the key sleeve 92 near the outer margin thereof and extends axially thereof into a bore 103 provided in the actuator sleeve 76 to prevent rotation of the key sleeve 92 with respect to the actuator sleeve 76. A guide bushing 106 is mounted within a bore 107 provided in the actuator sleeve 76 and carries O-ring seals 108 and 109 in which O-ring seal 108 engages the shaft 91 and the O-ring 109 engages the actuator sleeve 76. A nut 111 threadably engages the theaded lower extremity 91b of the shaft 91 and is provided with a flange 112 which engages a thrust ball bearing assembly 113. The assembly 113 engages the key sleeve 92 to hold the key sleeve 92 in place so it cannot move axially within the bore 93. The nut 111 is held in place by another thrust ball bearing assembly 114. The ball bearing assembly 114 is held in position within the bore and in engagement with the flange 112 by snap ring 116 seated in the actuator sleeve 76.

Means is provided for causing operation of the diaphragm actuator means 89 to cause axial movement of the shaft 91 and consists of a knob 121 of a size adapted to be grasped by a human hand. A set screw 122 extends through the knob and engages the nut 111 for causing rotation of the nut 111 and to thereby cause axial movement of the shaft 91. An O-ring 123 is provided for establishing sealing engagement between the shaft 91 and the knob 121. A sleeve 124 is provided on the shaft 91. It can be formed of a suitable material such as anodized aluminum to provide a bright color such as gold. The shaft 91 extends through the knob 121 and the distance that the jack screw 91 with its colored sleeve 124 extends out of the knob 121 indicates the position of the valve with respect to its being opened or closed. By way of example, if the valve is fully open, the shaft 91 will extend out of the knob 121 a quarter of an inch for a one inch valve and three-quarters of an inch for a two inch valve. A leak indication vent 126 is provided in the actuator sleeve 76 and is in communication with a passageway 127 provided in the diaphragm shoulder support member 81 to provide an indication that a leak has occurred through the diaphragm 66. An annular wiper seal 131 is provided and has a portion 132 disposed within the knob 121 and engages the exterior surface of the actuator sleeve 76. The wiper seal 131 extends beyond the knob 121 and in conjunction with the portion 132 serves to inhibit the passage of liquid between the actuator sleeve 76 and the knob 121.

Operation and use of the tank outlet valves 11 and 12 shown in FIGS. 1 and 2 may now be briefly described as follows. Let it be assumed that it is desired to utilize the tank outlet valves 11 and 12 on tanks utilized for aseptic processing of materials such as those utilized in making pharmaceuticals. Also, let it be assumed that the valves 11 and 12 have been formed of materials suitable for such aseptic use such as ASME SA 479 316L stainless steel for the metal parts and HSP XIX Class VI implantable silicone for the diaphragm 66 and that the valves 11 and 12 have been assembled by the use of sanitary clamps 79. The clamps 79 serve to clamp the actuator sleeve 76 to the valve body 16 of the valve 11 and the valve body 36 of the valve body 12 to firmly clamp the outer margin comprised of the portions 66e and 66f of the diaphragm 66 between the same. At the same time, the diaphragm shoulder support 81 urges portion 66c and the sealing surface 71 of the diaphragm 66 into engagement with the shoulder seat 72 or 73 to establish the primary axial seal hereinbefore described.

Let it be assumed that the head portion 66a of the diaphragm 66 is out of engagement with the seat 22 of the valve 11 and the seat 47 of the valve 12 and that it is desired to interrupt the communication between the inlet flow passage 23 and the outlet flow passage 27 of the valve 11 and the inlet flow passage 42 and the outlet flow passages 43 and 44 of the valve 12. The operator grasps the knob 121 and rotates the same in a clockwise direction to cause the nut 111 to rotate on the shaft 91 to move the shaft upwardly as viewed in FIG. 2 which moves the insert 83 upwardly as well as the head portion 66a of the diaphragm 66 toward the inlet passage 41. The force applied to move the head portion 66a toward the inlet passage 41 must be sufficient to overcome the pressure of the liquid in the tank connected to the inlet passage 41. Additional rotation of the knob 121 is continued until the surface 68 of the head portion 66a is moved into engagement with the valve seat 47 to form a positive liquid tight seal. The thrust forces which are generated in such a valve closing operation are transferred from the insert 83 through the shaft 91 to the nut 112 and to the thrust ball bearing assembly 114 which is held in place by the snap ring 116 retained in the actuator sleeve 76. As pointed out previously, the shaft 91 is prevented from rotation by the anti-rotation pin 101 and thus can only move in an axial direction when the knob 121 is rotated.

Let it be assumed that it is desired to open the valves 11 and 12. This can be accomplished by rotating the knob 121 in an opposite or counter-clockwise direction to rotate the nut 111 in a counter-clockwise direction to apply thrust forces to the ball bearing assembly 113 to move the shaft 91 downwardly and outwardly to thereby break the seal between the surface 68 and the annular valve seat 47. As the head portion 66a is moved toward an open position flow is permitted between the inlet flow passage 41 and the outlet flow passages 42 and 43 in the valve 12 shown in FIG. 2 or alternatively from the inlet flow passage 23 through the outlet passage 27 of the valve 11 shown in FIG. 1. If for example, a tank is being drained, the liquid in the tank will flow through the outlet passages and will flow completely out of the valve because the top surface 69 of the diaphragm 66 is at the same level as the flow passages 42 and 43.

The guide bushing 106 with its O-rings 108 and 109 serves to provide a seal so that in case of rupture of the diaphragm 66 it will serve as a secondary seal to keep liquid product passing through the passages 41, 42 and 43 from coming into contact with the operating parts of the diaphragm actuator means 89. In case there is such a rupture of the diaphragm 66, the presence of a liquid between the diaphragm 66 and the member 81 will become known because the liquid will leak out of the vent hole 126 and be readily visible externally of the valve 12. The vent hole 126 also provides additional insurance that liquids will not pass into the operating mechanisms of the diaphragm actuator means.

The diaphragm 66 provides a double axial seal which assures absolute product isolation. The valve is self-draining which assures that no product remains within the valve. The diaphragm is constructed in such a manner so that it can be readily changed. This can be accomplished by separating the actuator sleeve 76 from the valve body 36. As soon as this has been accomplished, the diaphragm can be grasped in one hand and the knob 121 in the other hand and the diaphragm 66 with the insert 83 thereon can be unthreaded from the upper extremity of the shaft 91 by counterclockwise rotation of the diaphragm 66. A new diaphragm with insert therein can be then threaded onto the shaft. Thereafter, the actuator sleeve 76 can be secured to the valve body 36 by the sanitary clamp 79.

Auxiliary ports are provided which make it possible to provide a steam lock product integrity or serial transfer of product. Also it permits cleaning of the valve assembly without access to the tank in which the valve is mounted.

Figure 4:
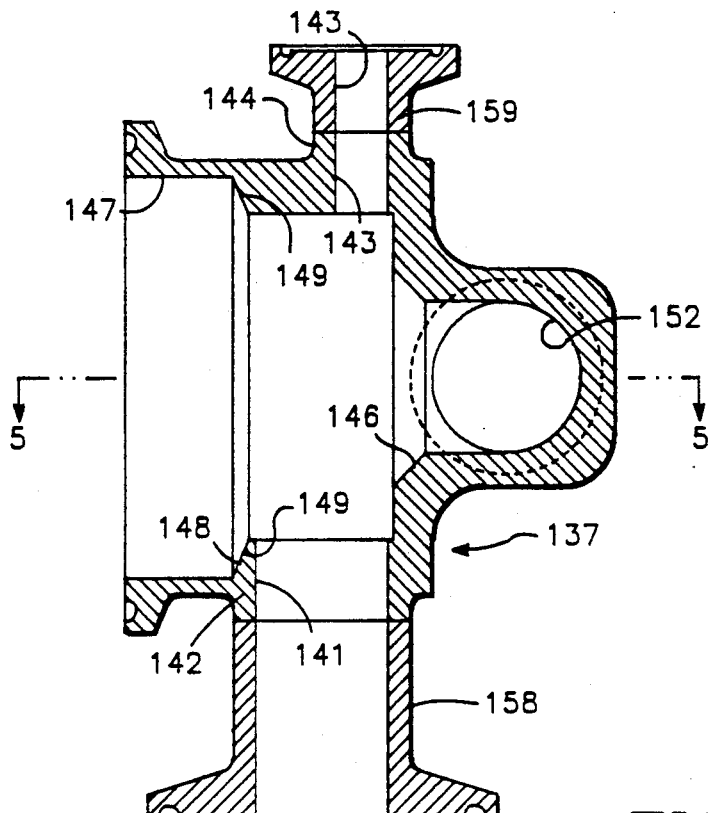
FIG. 4 is a cross-sectional view of another embodiment of an aseptic valve construction in the form of a pipe valve incorporating the present invention.
Figure 5:
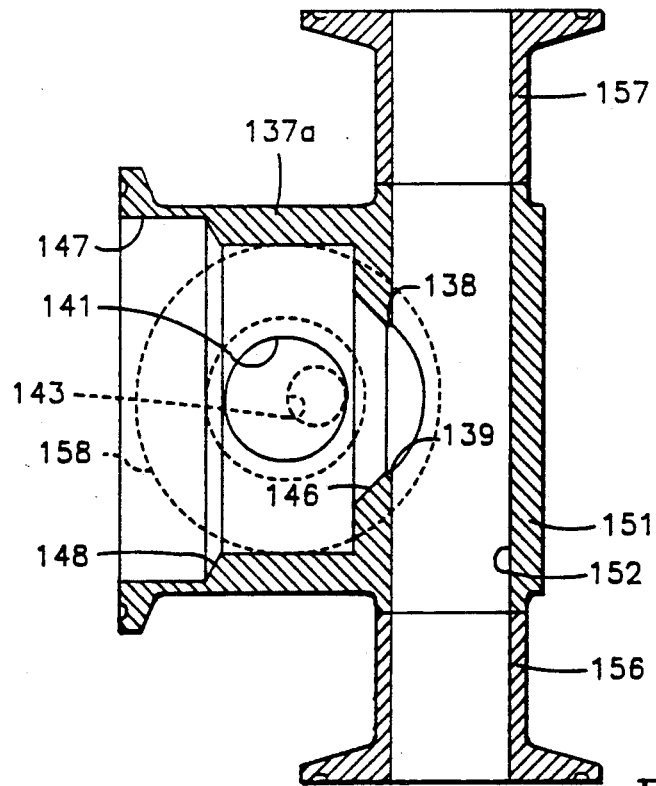
FIG. 5 is a cross-sectional view taken along the line 5—5 of FIG. 4.

Another aseptic valve construction incorporating the present invention is shown in FIGS. 4 and 5 in which a pipe valve 136 is provided which can be mounted in any desired orientation. It consists of a valve body 137 which is similar to the valve body 36 of the valve 12. It consists of a cylindrical portion 137a which is provided with an inlet 138. The inlet 138 provides an inlet flow passage 139 which is very short as for example, on the order of 1/16th of an inch which is in communication with an outlet flow passage 14 1 provided in an outlet 142 extending substantially at right angles to the inlet 138. It is also in communication with a cleaning port 143 provided in an outlet 144 diametrically opposite the outlet 142.

The valve body 137 is provided with an annular valve seat 146 which circumscribes the inlet flow passage 139. The valve body 137 is also provided with a large opening 147, which is opposite the inlet flow passage 139 which is adapted to receive diaphragm means 31 of the type hereinbefore described which is adapted to engage the valve seat 146 and also is adapted to engage the annular shoulder seat 148 provided on the shoulder 149 formed in the valve body 137 to provide primary and secondary seals of the type hereinbefore described and to thereby control the flow of liquids from the inlet flow passage 139 through the outlet flow passage 141.

A cylindrical pipe section 151 is formed integral with the valve body 137 and is provided with a flow passage 152 which extends therethrough in a direction which is at right angles to the inlet flow passage 139. Flanged pipe connectors 156 and 157 are secured to the pipe section 151 by suitable means such as welding and are adapted to be connected to other pipe sections by suitable means such as the sanitary clamps hereinbefore described. Similar type flanged pipe connectors 158 and 159 are mounted on the outlet 142 and on the outlet 144 and also are adapted to be connected to pipe sections by sanitary clamps (not shown).

The pipe valve 136 can be used and operated in the same manner as the tank outlet valves 11, 12 hereinbefore described. The pipe valve 136 can be connected directly into a pipe line so that the valve seat 146 becomes a part of the bottom side of the pipe line depending upon the orientation of the pipe line. As for example, the outlet 142 can be used for removing samples of product from the pipe line whereas the other outlet 144 can be utilized for cleaning the valve while the valve is in a closed position. Thus the pipe valve 136 can be utilized as a valve in the conventional sense and also can be utilized as an isolation device to provide additional utility.

It should be appreciated that one of the principal features of the pipe valve 136 is that it has a very short inlet, i.e., the 1/16" inlet flow passage 139 so that there is very little dead space which could possibly entrap product. The pipe valve 136 because of the construction, can take the place of a conventional arrangement in which normally a tee would be cut into the pipe line and then a valve connected to the pipe line. This has a disadvantage in that there would be considerable dead leg between the valve seat face and the edge of the flow path in the pipe line. This dead leg would have a tendency to entrap product so that it would not move and become rancid or stagnant. The pipe valve 136 of the present invention overcomes this distinct disadvantage in that it provides a takeoff valve and a tee incorporated into a single valve having a very small, or in other words, minimal dead space in the form of the 1/16" long inlet flow passage 139. Thus the construction of the pipe valve 136 makes it possible to place a valve seat on the edge of a pipe so that there is no wasted space making it possible to open the valve and take out a sample out of the pipe and close the valve again without any substantial effect on the flow of product through the pipe. In this way, clean samples can be taken from the pipe line which is particularly important for pharmaceutical and biotech uses. Such samples can be taken without threatening the sterility of the product flowing through the pipe line. After a sample has been taken out, and the valve is closed, sterility is reestablished in the valve by cleaning the valve by introducing a suitable cleaning agent as for example, steam through the cleaning port 143. The pipe valve is then sterile for the next sample withdrawal. After the next sample has been withdrawn, the pipe valve again can be sterilized in the same manner.

It should be appreciated that the aseptic valve construction of the present invention can be utilized in conjunction with a cylinder or motor driven actuator of the type which is conventionally available in place of the manually operated knobs provided on the valves shown in FIGS. 1 and 2. A conventional motor driven actuator can be utilized to operate the valve by revamping the shaft to accommodate the motor driven actuator in place of the knob.

Figure 6:
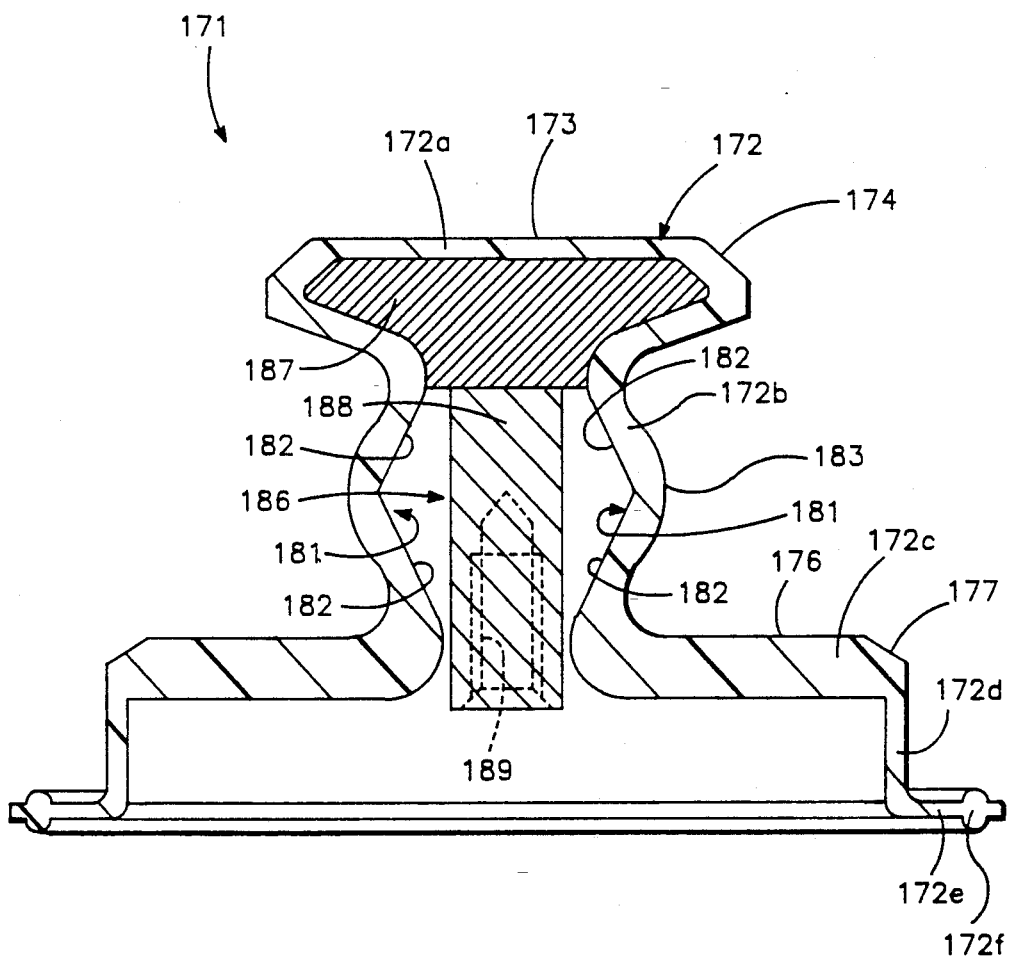
FIG. 6 is a cross-sectional view showing a different embodiment of the diaphragm shown in FIG. 2 which is particularly adapted for use with larger size valves.

Utilizing the construction hereinbefore described in conjunction with the building of valves of 1½ inch diameter and greater, it has been found that the diaphragm 66 when the convoluted or bellows portion 66b is being compressed during opening of the valve by movement of the diaphragm away from the valve seat 47, that the convoluted or bellows portion has a tendency to snap into one direction or the other toward the portion 68a or toward the portion 66c rather than bowing outwardly into a smooth symmetrical curve and therefore making it difficult to clean out the valve because of the possibility of entrapping material within the snapped together portions of the diaphragm when the valve is moved to an open position. To prevent this from occurring, diaphragm means 171 is provided as shown in FIG. 6. The diaphragm means 171 is comprised of a diaphragm 172 made of a suitable material such as medical grade silicone rubber. The diaphragm 172 is provided with an upper planar portion 172a which is provided with a planar surface 173 that is adapted to extend across the inlet passage of a valve in the same manner that the planar surface 67 extends across the inlet passage of the valve as shown in FIG. 2. The planar surface 173 adjoins an outwardly and downwardly inclined annular surface 174 which forms a part of the upper portion 172a. The upper or head portion 172a is formed integral with an intermediate or bellows portion 172 which is of a smaller diameter and is convoluted in an axial direction. The intermediate convoluted or bellows portion 172b adjoins a circular base portion 172 which has an annular planar surface 176 that is adapted to be moved into alignment with the outlet flow passages (not shown) in the same manner that the annular planar surface 69 can be moved into alignment with outlet flow passages 43 and 44 in the construction shown in FIG. 2.

The base portion 172c is also provided with a downwardly and outwardly inclined annular surface 177. The diaphragm 171 is provided with a downwardly depending portion 172d which adjoins a radially extending 172e. The radially extending portion 172e is provided with a enlargement 172f which forms a secondary radial seal as hereinbefore described in conjunction with the diaphragm 66 as shown in FIG. 2.

In order to ensure that the convoluted or bellows portion 172b will bow outwardly in a uniform arcuate shape rather than snapping into one position or the other, a vee-shaped recess 181 having straight surfaces extending circumferentially is provided in the inner wall of the convoluted or bellows portion 172b. Typically, the convoluted or bellows portion 172b would be of uniform cross section along its longitudinal length with the inner wall (not shown) following the smooth curvature of the outer convex surface 183. By providing a vee-shaped recess in the inner wall, there is provided a region of generally decreasing cross sectional area along the central axis of the diaphragm 171 from the ends of the diaphragm toward the midpoint of the convoluted or bellows portion 172b. Thus, the vee-shaped recess 181 has straight sides with an apex disposed equidistant between the ends of the convoluted portion 172b. This ensures that the diaphragm 171 when the valve is opened by moving the surface 174 away from the valve seat that it will bow outwardly in a smooth curve rather than snapping in one direction or the other. Since such a smooth curve is provided on the outer surface, the valve construction utilizing such a diaphragm when opened can be readily cleaned in the same manner as in the previous embodiments hereinbefore described.

An insert 186 forms a part of the diaphragm means 171 and consists of a head 187 which is disposed in the upper portion 172a, which is provided with a stem 188 which extends through the convoluted or bellows portion 172b and is adapted to be mated with the shaft (not shown) adapted to be threaded into a bore 198.

It can be seen from the foregoing that the straight sides or walls 182 provided by the annular vee-shaped recess 181 formed in the convoluted or bellows portion of the diaphragm ensures even outward deformation or bowing of the bellows portion 172b when the diaphragm 171 is retracted during opening of the valve. This ensures that two exterior surfaces of the diaphragm will never meet and form a crevice which would make cleaning of the valve more difficult.

It has been found that the diaphragm construction shown in FIG. 6 is particularly desirable for valves greater than 1½ inches in diameter and in which the vertical travel of the bellows during movement of the valve between open and closed positions is approximately ½ inch or greater. This is particularly true with respect to valves 2 inches in diameter and greater where there is travel of ¾ inch and greater between the surfaces 173 and 174 of the diaphragm between closed and open positions.

From the foregoing it can be seen that there has been provided an aseptic valve construction which has many advantages. The valves are constructed in such a manner that they can be readily inspected and cleaned. The diaphragm can be changed very rapidly when necessary. The valves particularly lend themselves to sanitary operations permitting cleaning and steam sterilization with the valves in place. In other words the valves can be cleaned and steamed sterilized without breaking the system once they are installed. Since the diaphragm is not subjected to rotary action during operation of the valve, there is no tendency for the diaphragm to become scarred and/or abraded by such rotary action. Greatly improved sealing is achieved with the diaphragm because of its three-dimensional shape.

We claim:

1. In an aseptic valve construction, a valve body having an inlet flow passage and at least one outlet flow passage, said valve body having a valve seat surrounding the inlet flow passage, said valve body having an opening therein in alignment with the inlet passage and with said at least one outlet passage, said valve body having a shoulder providing an annular shoulder seat surrounding said opening, said shoulder seat having an annular raised lip portion at its innermost extremity and a straight portion extending away from the raised lip portion, an actuator sleeve adapted to be secured to said valve body, a shaft, means mounting said shaft in said sleeve to permit axial movement of said shaft in said sleeve, a diaphragm, means removably securing said diaphragm to said shaft, said diaphragm having a first sealing portion movable into engagement with the valve seat surrounding the inlet passage, diaphragm actuator means engaging said shaft for causing axial movement of said shaft for moving said diaphragm between open and closed positions with respect to said valve seat whereby in a closed position said diaphragm interrupts the flow of a liquid from the inlet passage through the outlet passage and in an opening position permits the flow of liquid from the inlet passage to the outlet passage and means for preventing rotation of said diaphragm as said shaft is actuated to cause movement of said diaphragm between open and closed positions, said diaphragm having a second sealing portion engaging the shoulder seat which is retained in engagement with the shoulder seat during movement of the diaphragm between open and closed positions.

2. A valve construction as in claim 1 wherein said diaphragm has an annular planar portion which lies in a plane which is substantially flush with the outlet passage so that the valve construction will drain completely when the diaphragm is moved to an open position.

3. A valve construction as in claim 1 together with a shoulder support member mounted within the diaphragm and serving to move the diaphragm into engagement with the shoulder seat.

4. A valve construction as in claim 3 together with a bleed hole extending through said shoulder support member and extending to ambient.

5. A valve construction as in claim 1 together with a position indicator means mounted on the shaft for visually indicating whether said diaphragm is in an open or closed position with respect to the valve seat.

6. A valve construction as in claim 1 wherein said actuator means includes a nut threaded on said shaft and means for retaining said nut in said actuator sleeve whereby upon the rotation of said nut said shaft is moved axially.

7. A valve construction as in claim 6 wherein said actuator means includes a knob secured to said nut for rotating said nut.

8. A valve construction as in claim 1 together with means connected to said body for establishing communication with the inlet passage.

9. A valve construction as in claim 8 wherein said means connected to said valve body for establishing communication with said inlet passage includes a pipe section extending along an axis which is perpendicular to the axis of the outlet passage.

10. A valve construction as in claim 9 wherein said pipe section is formed integral with said valve body to provide an inlet flow passage which is relatively short in length.

11. A valve construction as in claim 9 wherein said body is provided with a cleaning port communication with the outlet passage.

12. A valve construction as in claim 1 wherein said diaphragm has an annular convoluted portion which is normally bowed outwardly and which when the diaphragm is moved from a closed position to an open position, the convoluted portion will be bowed outwardly to a greater extent.

13. A valve construction as in claim 12 wherein the convoluted portion is provided with a smooth convex outer surface.

14. A valve construction as in claim 13 wherein the convoluted portion is provided with a vee-shaped circumferentially extending inner surface to provide a convoluted portion which is of non-uniform cross section.

15. In an aseptic valve construction, a valve body having an inlet flow passage and at least one outlet flow passage, said valve body having a valve seat surrounding the inlet flow passage, said valve body having an opening therein in alignment with the inlet passage and with said at least one outlet passage, said valve body having a shoulder providing an annular shoulder seat surrounding said opening, said shoulder seat having an annular raised lip portion at its innermost extremity and a straight portion extending away from the raised lip portion, an actuator sleeve adapted to be secured to said valve body, a shaft, means mounting said shaft in said sleeve to permit axial movement of said shaft in said sleeve, a diaphragm, means removably securing said diaphragm to said shaft, said diaphragm having a first sealing portion movable into engagement with the valve seat surrounding the inlet passage, diaphragm actuator means engaging said shaft for causing axial movement of said shaft for moving said diaphragm between open and closed positions with respect to said valve seat whereby in a closed position said diaphragm interrupts the flow of a liquid from the inlet passage through the outlet passage and in an opening position permits the flow of liquid from the inlet passage to the outlet passage and means for preventing rotation of said diaphragm as said shaft is actuated to cause movement of said diaphragm between open and closed positions, said diaphragm having a second sealing portion engaging the shoulder seat which is retained in engagement with the shoulder seat during movement of the diaphragm between open and closed positions being provided with a generally cylindrical bellows portion extending between the first and second sealing portions of the diaphragm, said means securing said diaphragm to said shaft including a metallic insert disposed within said first sealing portion of the diaphragm and having a cylindrical portion extending through the bellows portion and spaced form the bellows portion of the diaphragm, and shaft being removably mounted in said insert.

16. In an aseptic valve construction, a valve body having an inlet flow passage and at least one outlet flow passage, said valve body having a valve seat surrounding the inlet flow passage, said valve body having an opening therein in alignment with the inlet passage and with said at least one outlet passage, said valve body having a shoulder providing an annular shoulder seat surrounding said opening, said shoulder seat having an annular raised lip portion at its innermost extremity and a straight portion extending away from the raised lip portion, an actuator sleeve adapted to be secured to said valve body, a shaft, means mounting said shaft in said sleeve to permit axial movement of said shaft in said sleeve, a diaphragm, means removably securing said diaphragm to said shaft, said diaphragm having a first sealing portion movable into engagement with the valve seat surrounding the inlet passage, diaphragm actuator means engaging said shaft for causing axial movement of said shaft for moving said diaphragm between open and closed positions with respect to said valve seat whereby in a closed position with diaphragm interrupts the flow of a liquid from the inlet passage through the outlet passage and in an opening position permits the flow of liquid from the inlet passage to the outlet passage and means for preventing rotation of said diaphragm as said shaft is actuated to cause movement of said diaphragm between open and closed positions, said diaphragm having a second sealing portion engaging the shoulder seat which is retained in engagement with the shoulder seat during movement of the diaphragm between open and closed positions said shoulder seat is provided with an annular raised lip portion being formed by an annular surface inclined inwardly and upwardly and an innermost portion inclined downwardly therefrom.

17. In an aseptic valve construction, a valve body having an inlet flow passage and at least one outlet flow passage, said valve body having a valve seat surrounding the inlet flow passage, said valve body having an opening therein in alignment with the inlet passage and with said at least one outlet passage, said valve body having a shoulder providing an annular shoulder seat surrounding said opening, said shoulder seat having an annular raised lip portion at its innermost extremity and a straight portion extending away from the raised lip portion, an actuator sleeve adapted to be secured to said valve body, a shaft, means mounting said shaft in said sleeve to permit axial movement of said shaft in said sleeve, a diaphragm, means removably securing said diaphragm to said shaft, said diaphragm having a first sealing portion movable into engagement with the valve seat surrounding the inlet passage, diaphragm actuator means engaging said shaft for causing axial movement of said shaft for moving said diaphragm between open and closed positions with respect to said valve seat whereby in a closed position said diaphragm interrupts the flow of a liquid from the inlet passage through the outlet passage and in an opening position permits the flow of liquid from the inlet passage to the outlet passage and means for preventing rotation of said diaphragm as said shaft is actuated to cause movement of said diaphragm between open and closed positions, said diaphragm having a second sealing portion engaging the shoulder seat which is retained in engagement with the shoulder seat during movement of the diaphragm between open and closed positions a key sleeve disposed within the actuator sleeve and cooperative key means extending between the key sleeve and the shaft for preventing rotational movement of the shaft with respect to the key sleeve but permitting axial movement of the shaft with respect to the key sleeve and pin means disposed in the key sleeve and the actuator sleeve for retaining the key sleeve in a fixed rotational position with respect to the actuator sleeve.

18. In an aeseptic valve construction, a valve body having an inlet flow passage and at least one outlet flow passage, said valve body having a valve seat surrounding the inlet flow passage, sad valve body having an opening therein in alignment with the inlet passage and with said at least one outlet passage, said valve body having a shoulder providing an annular shoulder seat surrounding said opening, said shoulder seat having an annular raised lip portion at its innermost extremity and a straight portion extending away from the raised lip portion, an actuator sleeve adapted to be secured to said valve body, a shaft, means mounting said shaft in said sleeve to permit axial movement of said shaft in said sleeve, a diaphragm, means removably securing said diaphragm to said shaft, said diaphragm having a first sealing portion movable into engagement with the valve seat surrounding the inlet passage, diaphragm actuator means engaging said shaft for causing axial movement of said shaft for moving said diaphragm between open and closed positions with respect to said valve seat whereby in a closed position said diaphragm interrupts the flow of a liquid from the inlet passage through the outlet passage and in an opening position permits the flow of liquid from the inlet passage to the outlet passage and means for preventing rotation of said diaphragm as said shaft is actuated to cause movement of said diaphragm between open and closed positions, said diaphragm having a second sealing portion engaging the shoulder seat which is retained in engagement with the shoulder seat during movement of the diaphragm between open and closed positions said nut being provided with a flange together with bearing means disposed within the actuator sleeve and engaging opposite sides of the flange and means disposed within the actuator sleeve for retaining said bearing means in engagement with opposite sides of the flange.

19. In an aseptic valve construction, a valve body having an inlet flow passage and at least one outlet flow passage, said valve body having a valve seat surrounding the inlet flow passage, said valve body having an opening therein in alignment with the inlet passage and with said at least one outlet passage, said valve body having a shoulder providing an annular shoulder seat surrounding said opening, said shoulder seat having an annular raised lip portion at its innermost extremity and a straight portion extending away from the raised lip portion, an actuator sleeve adapted to be secured to said valve body, a shaft, means mounting said shaft in said sleeve to permit axial movement of said shaft in said sleeve, a diaphragm, means removably securing said diaphragm to said shaft, said diaphragm having a first sealing portion movable into engagement with the valve seat surrounding the inlet passage, diaphragm actuator means engaging said shaft for causing axial movement of said shaft for moving said diaphragm between open and closed positions with respect to said valve seat whereby in a closed position said diaphragm interrupts the flow of a liquid from the inlet passage through the outlet passage and in an opening position permits the flow of liquid from the inlet passage to the outlet passage and means for preventing rotation of said diaphragm as said shaft is actuated to cause movement of said diaphragm between open and closed positions, said diaphragm having a second sealing portion engaging the shoulder seat which is retained in engagement with the shoulder seat during movement of the diaphragm between open and closed positions a wiper seal having a portion disposed within the knob and having a portion extending beyond the knob, said wiper seal engaging the exterior surface of the actuator sleeve and serving to inhibit the passage of liquid between the actuator sleeve and the knob.

20. In an aseptic valve construction, a valve body having an inlet flow passage and at least one outlet flow passage, said valve body having a valve seat surrounding the inlet flow passage, said valve body having an opening therein in alignment with the inlet passage and with said at least one outlet passage, said valve body having a shoulder providing an annular shoulder seat surrounding said opening, sad shoulder seat having an annular raised lip portion at its innermost extremity and a straight portion extending away from the raised lip portion, an actuator sleeve adapted to be secured to said valve body, a shaft, means mounting said shaft in said sleeve to permit axial movement of said shaft in said sleeve, a diaphragm, means removably securing said diaphragm to said shaft, said diaphragm having a first sealing portion movable into engagement with the valve seat surrounding the inlet passage, diaphragm actuator means engaging said shaft for causing axial movement of said shaft for moving said diaphragm between open and closed positions with respect to said valve seat whereby in a closed position said diaphragm interrupts the flow of a liquid from the inlet passage through the outlet passage and in an opening position permits the flow of liquid from the inlet passage to the outlet passage and means for preventing rotation of said diaphragm as said shaft is actuated to cause movement of said diaphragm between open and closed positions, said diaphragm having a second sealing portion engaging the shoulder seat which is retained in engagement with the shoulder seat during movement of the diaphragm between open and closed positions first and second outlet passages in said valve body and in communication with said flow passage extending through said valve body, one of said outlet passages serving as a cleaning passage to permit cleaning of the valve construction during the time the diaphragm means is in a closed position with respect to said valve seat.

21. In an aseptic valve construction, a valve body having an inlet flow passage and at least one outlet flow passage, said valve body having a valve seat surrounding the inlet flow passage, said body having an opening therein in alignment with the inlet passage and in communication with the inlet passage and with said at least one outlet passage, said body having a shoulder providing a shoulder seat surrounding said opening, an actuator sleeve adapted to be secured to said valve body, a shaft, means mounting said shaft in said sleeve to permit axial movement of said shaft in said sleeve, a diaphragm removably secured to said shaft, said diaphragm having a portion movable into engagement with the valve seat surrounding the inlet passage, diaphragm actuator means engaging said shaft for causing axial movement of said shaft for moving said diaphragm between open and closed positions with respect to said valve seat whereby in a closed position said diaphragm interrupts the flow of a liquid from the inlet passage through the outlet passage and in an open position permits the flow of liquid from the inlet passage to the outlet passage and means for preventing rotation of said diaphragm as said shaft is actuated to cause movement of said diaphragm between open and closed positions, said diaphragm having a portion engaging the shoulder seat which is retained in engagement with the shoulder seat during movement of the diaphragm between open and closed positions, said diaphragm having an annular convoluted portion which is normally bowed outwardly and which when the diaphragm is moved from a closed position to an open position, the convoluted portion will be bowed outwardly to a greater extent, said convoluted portion being provided with a smooth convex outer surface, and a vee-shaped inner surface circumferentially extending said inner vee-shaped surface having straight sides.

22. A valve construction as in claim 21 wherein said vee-shaped recess has an apex which is disposed equidistant between the ends of the convoluted portion.

23. In an aseptic valve construction, a valve body having an inlet flow passage and at least one outlet flow passage, said valve body having a valve seat surrounding the inlet flow passage, said valve body having an opening therein in alignment with the inlet passage and in communication with the inlet passage and with said at least one outlet passage, said body having a shoulder providing a shoulder seat surrounding said opening, a diaphragm having a surface adapted to be moved into engagement with said valve seat and having another surface in engagement with said shoulder seat, said diaphragm having an annular convoluted portion extending between the surface engaging said valve seat and the surface engaging said shoulder seat, said convoluted portion of said diaphragm having an annular outwardly bowed portion having a smooth convex outer surface and having a cross section which is non-uniform to provide a region of reduced cross section substantially equidistant from the ends of the convoluted portion to ensure that the convoluted portion will bow outwardly in a uniform manner when the surface of the diaphragm is moved away from the valve seat and serving to prevent the convoluted portion from snapping into one position or the other.

24. In an aseptic valve construction, a valve body having an inlet flow passage and at least one outlet flow passage, said valve body having a valve seat surrounding the inlet flow passage, said valve body having an opening therein in alignment with the inlet passage and in communication with the inlet passage and with said at least one outlet passage, said body having a shoulder providing a shoulder seat surrounding said opening, a diaphragm having a surface adapted to be moved into engagement with said valve seat and having another surface in engagement with said shoulder seat, said diaphragm having an annular convoluted portion extending between the surface engaging said valve seat and the surface engaging said shoulder seat, said convoluted portion of said diaphragm having an annular outwardly bowed portion having a smooth convex outer surface and having a cross section which is non-uniform to ensure that the convoluted portion will bow outwardly in a uniform manner when the surface of the diaphragm is moved away from the valve seat and serving to prevent the convoluted portion from snapping into one position or the other, said convoluted portion of said diaphragm being provided with an inner surface which is substantially vee-shaped in cross section, the apex of the vee being substantially equidistant from opposite ends of the convoluted portion.

* * * * *

UNITED STATES PATENT AND TRADEMARK OFFICE
CERTIFICATE OF CORRECTION

PATENT NO. : 5,152,500
DATED : October 6, 1992
INVENTOR(S) : Hoobyar et al.

It is certified that error appears in the above-identified patent and that said Letters Patent is hereby corrected as shown below:

Claim 15, column 11,
Line 31, delete "form" and replace with -- from --.

Claim 16,
Line 54, delete "with" and replace with -- said --.

Claim 18, column 12,
Line 43, delete "sad" and replace with -- said --;

Claim 20, column 13,
Line 51, delete "sad" and replace with -- said --.

Signed and Sealed this

Twenty-fifth Day of September, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 5,152,500
DATED : October 6, 1992
INVENTOR(S) : Hoobyar et al.

It is certified that error appears in the above-identified patent and that said Letters Patent is hereby corrected as shown below:

Column 9, claim 1,
Line 49, before "with" insert -- in communication with the inlet passage and --;
Line 51, after "an" insert -- inwardly and upwardly inclined --;
Lines 52-54, delete "raised lip portion at its innermost extremity and a straight portion extending away from the raised lip portion" and replace with -- surface and an annular innermost lip which is inclined downwardly from the annular surface --.

Column 10, claim 15,
Line 66, before "with" insert -- in communication with the inlet passage and --;

Column 11, claim 15,
Line 31, delete "form" and replace with -- from --.

Column 11, claim 16,
Line 38, before "with" insert -- in communication with the inlet passage and --;
Lines 42-44, delete "annular raised lip portion at its innermost extremity and a straight portion extending away from the raised lip portion" an replace with -- inwardly and upwardly inclined annular surface and an innermost annular lip which is inclined downwardly from the annular surface --;
Line 54, delete "with" and replace with -- said --.

Column 12, claim 17,
Line 6, before "with" insert -- in communication with the inlet passage and --;
Lines 9-11, delete "annular raised lip portion at its innermost extremity and a straight portion extending away from the raised lip portion" and replace with -- inwardly and upwardly inclined annular surface and an innermost annular lip which is inclined downwardly for the annular surface --.

Column 12, claim 18,
Line 43, delete "sad" and replace with -- said --;
Line 45, before "with" insert -- in communication with the inlet passage and --;
Lines 48-50, delete "annular raised lip portion at its innermost extremity and a straight portion extending away from the raised lip portion" and replace with -- inwardly and upwardly inclined annular surface and an innermost annular lip which is inclined downwardly from the annular surface --.

UNITED STATES PATENT AND TRADEMARK OFFICE
CERTIFICATE OF CORRECTION

PATENT NO. : 5,152,500
DATED : October 6, 1992
INVENTOR(S) : Hoobyar et al.

It is certified that error appears in the above-identified patent and that said Letters Patent is hereby corrected as shown below:

<u>Column 13, claim 19,</u>
Line 13, before "with" insert -- in communication with the inlet passage and -- ;
Lines 9-11, delete "annular raised lip portion at its innermost extremity and a straight portion extending away from the raised lip portion" and replace with -- inwardly and upwardly inclined annular surface and an innermost annular lip which is inclined downwardly from the annular suface --.

<u>Column 13, claim 20,</u>
Line 49, before "with" insert -- in communication with the inlet passage and --;
Line 51, delete "sad" and replace with -- said --;
Lines 52-54, delete "annular raised lip portion at its innermost extremity and a straight portion extending away from the raised lip portion" and replace with -- inwardly and upwardly inclined annular surface and an innermost annular lip which is inclined downwardly from the annular surface --.

Signed and Sealed this

Nineteenth Day of March, 2002

*Attest:*

*Attesting Officer*

JAMES E. ROGAN
*Director of the United States Patent and Trademark Office*